Patented Oct. 7, 1924.

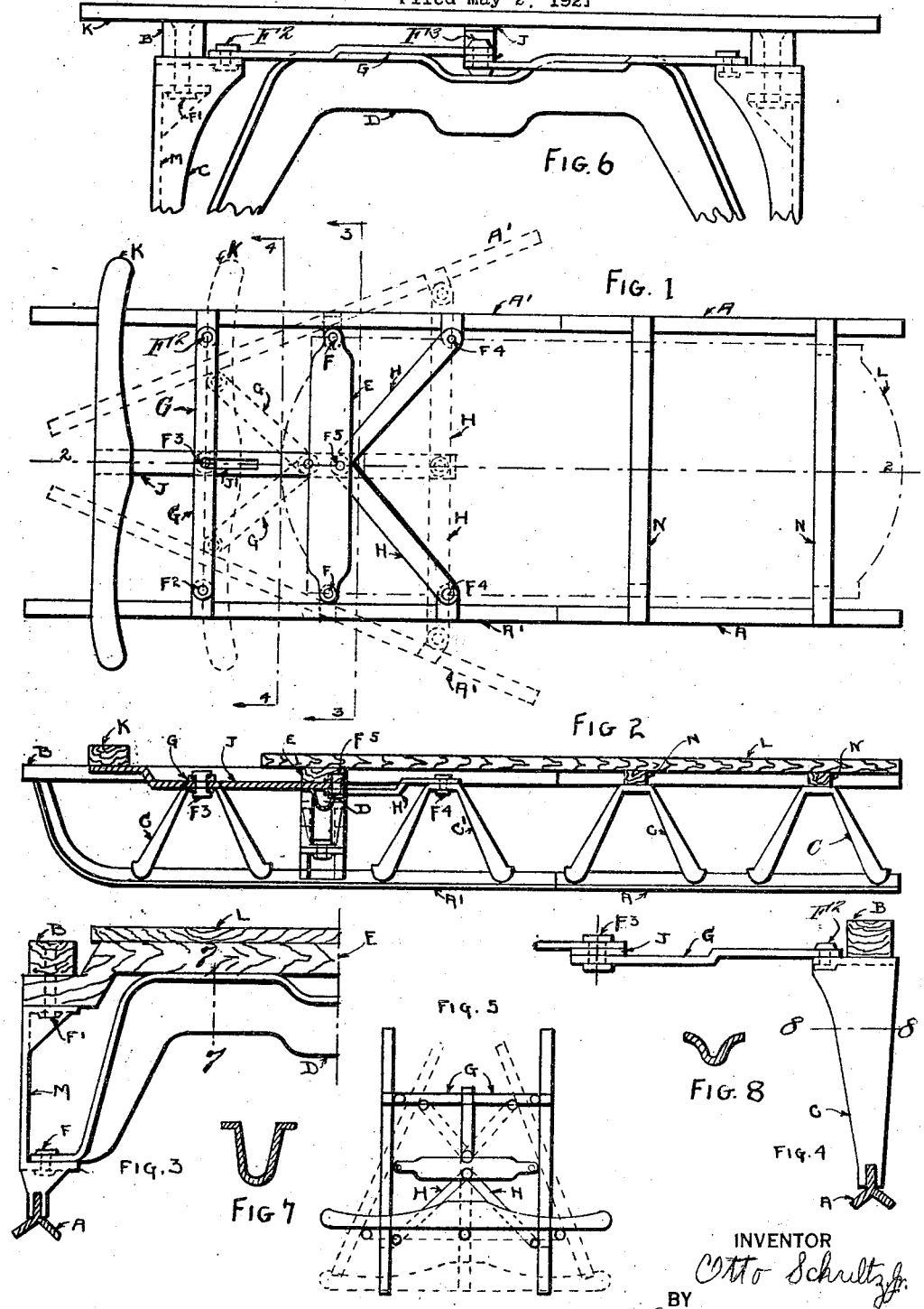

1,510,560

UNITED STATES PATENT OFFICE.

OTTO SCHULTZ, JR., OF NEWBURGH, NEW YORK.

SLEIGH.

Application filed May 2, 1921. Serial No. 466,122.

*To all whom it may concern:*

Be it known that I, OTTO SCHULTZ, Jr., a citizen of the United States, and a resident of Newburgh, New York, have invented certain Improvements in Sleighs, of which the following description, in connection with the accompanying drawings, is a specification, like reference characters on the drawings designating like parts.

This invention relates to sleighs, and is of particular utility when embodied in the construction of a coaster, or "bob-sled", although I contemplate the use of my invention for power driven sleighs, animal drawn sleighs, or in any field for which my improvements are adapted by their nature.

An important object of my invention is to provide a novel and powerful brake or appliance for retarding the motion of a sleigh, in the form of one or more runners, comprising sections or members of the usual sleigh runners, preferably, but mounted pivotally in accordance with my invention, so that each of said runner braking devices can be swung transversely or diagonally of the direction of movement of the sleigh, to stop or retard the same.

In carrying my improvement into effect, I prefer to provide a pair of runner members so pivoted, and to arrange for their operation into converging or diverging relation, as this furnishes the most powerful braking effect, and a further object of my invention is served by my provision of means to operate these braking runners manually, preferably by a lever, or system of levers, comprising toggles, which the user of the sleigh can actuate, by hand or foot, to exercise the braking action.

The various features of my invention will be illustrated and described in the accompanying drawings and specification and pointed out in the claims.

In the drawings,

Figure 1, is a plan view of a sleigh in the construction of which my improvements have been embodied, the full lines showing the parts in their free running position, and the dotted lines indicating the operative, or braking, position of the operating parts;

Figure 2, is a view in vertical, longitudinal section on the line 2—2 of Fig. 1;

Figure 3, is a partial, transverse section on the line 3—3 Fig. 1;

Figure 4, is a partial, transverse section on the line 4—4, Fig. 1; and

Figure 5, is a fragmentary, plan view of a diagrammatic character, similar to a portion of Figure 1, but on a smaller scale, and indicating an arrangement of the braking members divergently instead of convergently for the braking operation.

Figure 6, is a view in front elevation of the sleigh illustrated in Fig. 1.

Figure 7 is a vertical sectional view on the line 7—7 of Figure 3.

Figure 8 is a vertical section on the line 8—8 of Figure 4.

In the embodiment of my invention selected for illustration and description to permit ready and complete understanding of my improvements, the part designated by the reference character A is one of the runners of a sleigh, of which there may be any suitable number, and which may be of usual or suitable contour to carry my invention into effect.

I have shown two of these runners A in the instance illustrated, as usual in hand coasters or bob sleds of this type, and the frame B, and supports C, with the cross pieces E, N, and body L, may be, and preferably are, of usual and well known construction, their particular form and arrangement not constituting an essential feature of my invention.

In accordance with an important feature of my invention, one or more of the runners, preferably each, as illustrated, is pivoted, or is provided with a section or member A′ mounted pivotally, as at F and F′, by any suitable means, such as the bolts or rivets indicated, which connect uprights M, mounted on the runner members A′, in rotatable relation with the frame members B and E, and preferably with a truss-like member D also, so that these members A′ can be swung transversely or diagonally of the line of movement into the dotted line position shown in Fig. 1, acting to retard the progress of the sleigh.

Normally the members above described occupy their full line position, in which the sleigh is free-running, and any suitable means may be provided to swing them to and fro between the two positions, such means preferably comprising a lever, or system of levers, such as those shown at G, H and K, operable manually to actuate the uprights M and runner members A′, and to correlate their movements and impart stability to the braking system.

In the instance illustrated, the parts designated by the reference characters G are a pair of toggle-levers extending horizontally across the frame between opposite pairs of members C with which the outer ends of the toggle-levers are connected pivotally, as at $F^2$, the inner ends of these levers having a common operating pivot $F^3$ which passes through an operating slot J′ in a bar J extending rearwardly from a handle or cross bar K which can be grasped and pulled rearwardly by the rider to "break" the toggles from their full line to their dotted line position, thus operating the runners to retard the sleigh.

I prefer to provide a similar pair of toggle-levers H, also connected pivotally, as at $F^4$, with the runner braces, C′, to the rear of the pivots F, these toggles having a common operating pivot $F^5$, passing through, and actuated by, the bar J simultaneously with the forward toggle.

When the rider pushes forward the cross bar K, the parts will be restored to their full line, free running position, where they are practically locked by the position of the levers G, extending directly across the sleigh. This system of toggle levers can however be arranged as shown in Fig. 5, to operate by pushing the cross bar K forward, from full line to dotted line position, to throw the members A′, divergently into operating position, the construction and operation being substantially identical with that already described.

Having illustrated my invention thus fully, and suitable means by which the same may be carried into effect, I wish it to be understood that I do not limit myself to the specific construction and materials selected for illustration and description by way of example, nor do I limit myself in general otherwise than as set forth in the claims read in connection with this specification.

What I claim as new, and desire to secure by Letters Patent of the United States of America is:—

1. A sleigh having a member serving as a runner and mounted pivotally to swing into position to act as a brake.

2. A sleigh having a plurality of members serving respectively as runners, and mounted pivotally to swing into position to act co-operatively as a brake.

3. A sleigh having a plurality of members serving respectively as runners, and mounted pivotally to swing into convergent relative positions, to act co-operatively as a brake.

4. A sleigh having a member serving as a runner, and mounted pivotally to swing into position to act as a brake, and means to actuate said member manually.

5. A sleigh having a pair of members serving respectively as runners, and mounted pivotally to swing into position to act co-operatively as a brake, and a system of toggle-levers to actuate said members.

6. A sleigh, a pair of pivoted runner members, a plurality of pairs of toggle levers connecting the same, an operating bar movable across said toggle levers to operate them to cause said runners to assume braking positions across the line of movement of said sleigh, and a cross bar to permit manual actuation of said operating bar.

Signed at New York in the county and State of New York this eighteenth day of April, 1921.

OTTO SCHULTZ, Jr.

Witnesses:
ALEXANDER C. PROUDFIT,
MAURICE LEFKARL.